March 14, 1967 J. S. GALLO 3,309,258
FLOWER CHAIN HOLDER
Filed July 12, 1965
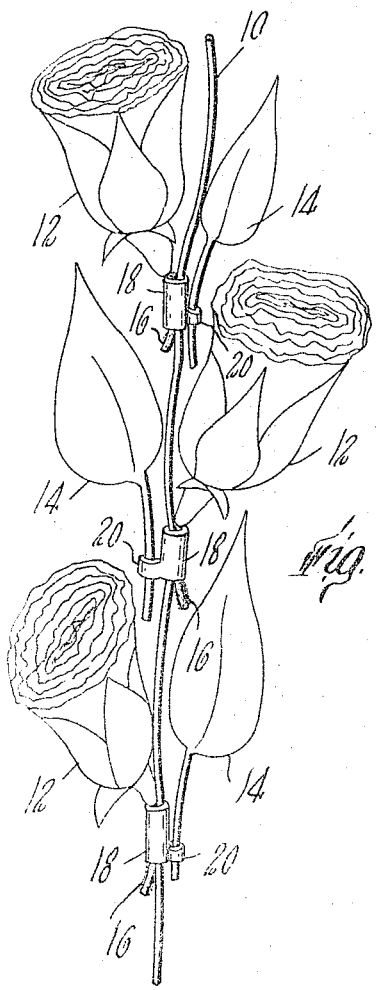
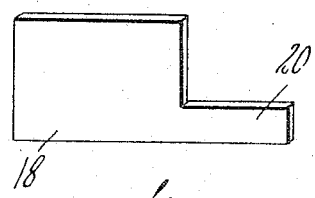
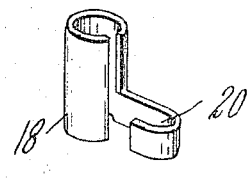
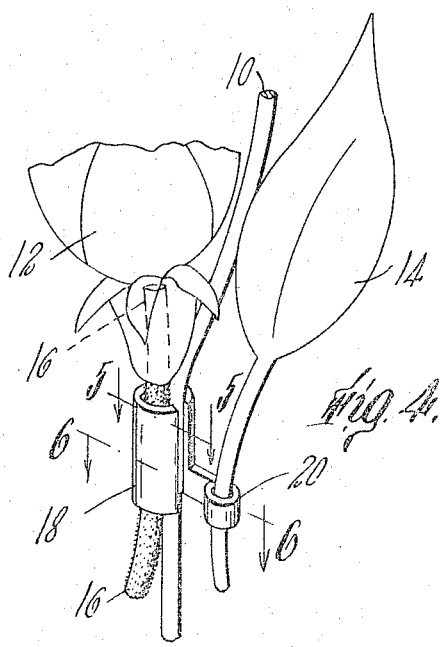
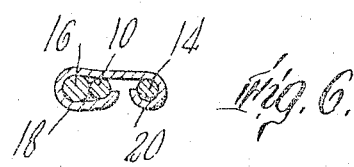

United States Patent Office 3,309,258
Patented Mar. 14, 1967

3,309,258
FLOWER CHAIN HOLDER
Joseph S. Gallo, Walpole, Mass., assignor to Lion Ribbon Company, Inc., New York, N.Y., a corporation of New York
Filed July 12, 1965, Ser. No. 471,186
1 Claim. (Cl. 161—26)

The present invention relates to a flower chain holder, and more particularly to a flower chain holder adapted for supporting in spaced relation a series of flower bud and leaf spray units as flower garlands, rosaries, and the like florist items.

It is a principal object of the invention to provide a simple and easily assembled flower chain holder which is especially constructed and arranged for the rapid and efficient assembly thereon of a series of flower bud and leaf spray units.

It is a further object of the invention to provide an improved flower bud and leaf spray holder unit which is formed of a minimum number of parts, is small and inexpensive to manufacture and provides a firm, tenacious support for the flower bud and leaf spray to be mounted thereon.

With the above and other objects in view as may hereinafter appear the several features of the invention will be readily appreciated from the following description taken in connection with the accompanying drawing in which:

FIG. 1 is a view in elevation of a portion of a flower bud garland built up on my improved flower chain holder;

FIG. 2 is a perspective view of the soft metal blank from which the clip for holding a flower bud and leaf spray on a supporting strand is made;

FIG. 3 is a perspective view of the clip molded to shape preparatory to asssembly with the supporting strand and flocked wire stem on which a flower bud will be impaled;

FIG. 4 is a perspective view on an enlarged scale of one of the flower bud and leaf spray units illustrated in FIG. 1;

FIG. 5 is a detail sectional view taken on a line 5—5 of FIG. 4; and

FIG. 6 is a detail sectional view taken on a line 6—6 of FIG. 4.

The flower chain holder illustrated in the drawing comprises a supple supporting strand 10 to which are attached a series of bud and leaf stem supporting units each adapted to receive a flower bud 12 and a leaf spray 14. The holder is in the nature of a skeleton frame which may be employed by a florist to build up a flower bud chain, garland, rosary, or the like by simply filling in the several holders with the requisite flower buds and leaf sprays.

Each said flower bud and spray unit comprises more particularly a short bud supporting stem 16 having a rough holding surface texture, as for example, a flocked wire, and a metal clip 18 in the form of a soft metal band of such width that it can be wrapped around and clinched over the lower end portion of the stem 16 and around the supple supporting strand 10. Said band is formed with a narrow strip extension 20 which is adapted to be wrapped around the stem of a leaf spray 14 during the assembly of the flower buds and leaf sprays thereon.

The combined flower bud and leaf spray holder unit above described provides a simple and effective frame on which flower arrangements of this particular type can be constructed by the florist with a minimum of time and expense. The asssembled buds and leaf sprays are held firmly in position to withstand the rather substantial amount of handling to which the articles may be subjected. With the arrangement shown narrow strip extension 20 is readily bent to move the leaf spray wrapped therein to any desired position with relation to the associated clamped flower bud and thus to obtain a most suitable arrangement of each leaf spray and the associated clamped flower bud.

The invention having been described what is claimed is:

A flower chain holder supporting in spaced relation flower bud and leaf spray units for use as flower bud chain garlands, rosaries and the like florist items having, in combination, a supple supporting strand, and a series of flower bud and leaf stem supporting units on said strand, each said unit comprising a short bud supporting stem of stiff wire having a rough holding surface texture, and a soft metal clip of substantial width comprising a relatively wide metal strip clinched solely around said strand and said bud supporting stem, said wide metal strip having a narrow strip extension to be wrapped about a said leaf stem providing a leaf spray holder adjustable relatively to said clinched wide metal strip for positioning said leaf spray with relation to said clinched flower bud.

References Cited by the Examiner
UNITED STATES PATENTS

| 348,332 | 8/1886 | McLane | 47—41.13 X |
| 643,238 | 2/1900 | Saeger | 24—81 |
| 2,173,011 | 9/1939 | De Meester | 47—41 X |
| 2,741,050 | 4/1956 | Wittman | 24—5 |

ANTONIO F. GUIDA, *Acting Primary Examiner.*
ABRAHAM G. STONE, *Examiner.*
A. E. KOPECKI *Assistant Examiner.*